United States Patent

Salyer

[11] Patent Number: 6,047,106
[45] Date of Patent: Apr. 4, 2000

[54] WATER HEATING UNIT WITH INTEGRAL THERMAL ENERGY STORAGE

[76] Inventor: Ival O. Salyer, 6325 Shady Knoll Dr., Dayton, Ohio 45414

[21] Appl. No.: 08/791,001

[22] Filed: Jan. 30, 1997

[51] Int. Cl.[7] ...................................................... F24H 7/02
[52] U.S. Cl. ........................... 392/341; 392/456; 126/400; 165/10; 165/902
[58] Field of Search .................................. 392/449, 450, 392/451, 452, 453, 454, 341, 456; 165/10, 902, 158; 126/400

[56] References Cited

U.S. PATENT DOCUMENTS

| Re. 34,880 | 3/1995 | Salyer . | |
|---|---|---|---|
| 2,911,513 | 11/1959 | MacCracken | 126/400 |
| 3,401,682 | 9/1968 | Jakob | 126/400 |
| 3,485,216 | 12/1969 | Lawrence | 122/33 |
| 4,362,207 | 12/1982 | Farfaletti-Casali et al. | 165/10 |
| 4,617,332 | 10/1986 | Salyer et al. . | |
| 4,711,813 | 12/1987 | Salyer . | |
| 4,797,160 | 1/1989 | Salyer . | |
| 4,825,939 | 5/1989 | Salyer et al. . | |
| 4,964,402 | 10/1990 | Grim et al. | 128/80 H |
| 5,053,446 | 10/1991 | Salyer . | |
| 5,106,520 | 4/1992 | Salyer . | |
| 5,211,949 | 5/1993 | Salyer . | |
| 5,254,380 | 10/1993 | Salyer . | |
| 5,282,994 | 2/1994 | Salyer . | |
| 5,565,132 | 10/1996 | Salyer | 252/70 |
| 5,694,515 | 12/1997 | Goswami et al. | 392/341 |

FOREIGN PATENT DOCUMENTS

| 2570476 | 3/1986 | France . |
|---|---|---|
| 0107045 | 4/1989 | Japan . |
| 468602 | 3/1969 | Switzerland . |
| 398927 | 10/1932 | United Kingdom . |
| 1196336 | 6/1970 | United Kingdom . |
| 2035764 | 6/1980 | United Kingdom . |

OTHER PUBLICATIONS

Ival O. Salyer and Anil K. Sircar, From the University of Dayton Research Institute, "Phase Change Materials for Heating and Cooling of Residential Buildings and Other Applications".

Ival O. Salyer et al., Article from the Society of Automotive Engineers, Inc., entitled "Advanced Phase–Change Materials for Passive Solar Storage Applications," 1985.

*Primary Examiner*—John A. Jeffery
*Assistant Examiner*—Jiping Lu
*Attorney, Agent, or Firm*—Killworth, Gottman, Hagan & Schaeff, L.L.P.

[57] ABSTRACT

A water heater which comprises a phase change material having a thermal energy capacity of at least about 25 cal/g and having a freezing/melting temperature from about 15° C. to about 100° C.; a source of water, a heating element for heating the water; a heat exchange unit which contains phase change material; and a plurality of heat exchange tubes positioned in the heat exchange unit with the phase change material located between and around the heat exchange tubes which are in heat transfer relation to the phase change material and in fluid connection with the source of water so that the water heated by the heating element flows through the tubes, heats the phase change material and thereafter the heat stored in the phase change material can be transferred to water flowing therethrough.

6 Claims, 3 Drawing Sheets

WATER HEATING UNIT WITH INTEGRAL THERMAL ENERGY STORAGE

BACKGROUND OF THE INVENTION

Conventional water heaters provide heated water by storing heat energy in the water. Because the heat energy is stored in the water, a large portion of the heater must be dedicated to storing the heated water until it is used. Typically, water stores approximately 10 calories/gram of heat per 10° C. increments. By requiring a large portion of the heater for storage of heated water, the water heater must be of reasonable size to store enough heated water for use in a standard residential environment. Typical residential water heaters have a 30–40 gallon capacity. For use in buildings and industry, water heaters must be even larger.

Water heaters consume a high percentage of residential energy heating water for bathing, washing dishes, washing clothes and heating homes and offices. In homes heated by electricity, the consumption of electric power is even greater. Overall, a large imbalance in electric power usage exists during the day time due primarily to the large amounts of power consumed by industry, businesses and public transportation. In many locations, day time peak usage is twice that of the night hours. To compensate for the extensive day time use of electric power, utility companies provide generating capacity sufficient to supply day time usage, leaving unused capacity available for the night hours.

In order to reduce an ever expanding need for day time power, utility companies are providing incentive pricing for off-peak power usage to encourage more use of the existing surplus night power capacity. This practice is common in Japan, in some European countries, and in a few locations in the United States.

Further, the ever increasing use of fossil fuels world wide for heating and cooling applications contributes significantly to the depletion of irreplaceable raw materials. Additionally, the burning of fossil fuels of all kinds is resulting in atmospheric pollution with nitrogen oxides and in higher concentrations of carbon dioxide in the atmosphere. The carbon dioxide buildup is of increasing concern because it may eventually result in drastic changes in global climates through global warming.

Thus, a need has arisen in the art for a water heater which can more efficiently heat water, which can make effective use of utilities during off-peak hours to minimize building and household power consumption and which would consequently reduce building and household utility costs. Further, there is an urgent need to adopt energy conservation technologies to stretch the supply of available fossil fuels until non-polluting energy can be developed and implemented.

SUMMARY OF THE INVENTION

The present invention solves the existing needs in the art by providing a water heater which can more effectively heat water, which can make efficient use of electricity during off-peak hours to minimize household power consumption in homes using electricity and which consequently reduces household utility costs. The invention also addresses the need to reduce fossil fuel consumption and the resulting air pollution and carbon dioxide build-up through the use of renewable solar photovoltaic and wind energy to supply all the power for the water heater.

The water heater includes a phase change material having a latent heat greater than the sensible heat of liquid water; a heating element for heating said phase change material; a heat exchange unit which contains said phase change material; and a plurality of heat exchange tubes positioned in said heat exchange unit, said tubes in heat transfer relation to said phase change material so that heat stored in said phase change material can be transferred to water. The water heater further includes a shell having an exterior surface, the heating element and the heat exchange unit being enclosed in the shell, and a layer of insulation on the exterior surface of the shell. The insulation desirably has an "R" value of at least about 10 and more desirably is vacuum panel insulation having an "R" value of at least about 25 per inch of thickness.

The heating element heats water which heats the phase change material. Desirably the phase change material will have a freezing/melting temperature from about 15° C. to about 100° C. More desirably, the phase change material also has a thermal energy capacity of at least about 25 cal/g.

One of the phase change materials useful in the present invention is a solidified melt mixture of a linear crystalline alkyl hydrocarbon phase change material, a polyolefin resin, an ethylene copolymer, and silica particles. The desirable weight percentage of each ingredient, based on the total weight of the composite, is about 60% phase change material, about 16–22% polyolefin, about 8–12% ethylene copolymer, and about 8–16% silica particles.

Another useful phase change material is selected from the group consisting of crystalline organic compounds such as linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons.

Other useful phase change materials are selected from the group consisting of a polyethylene glycol; a polyethylene oxide having a molecular weight of at least about 50,000 m.w.u.; and a polymer blend comprising a polyethylene glycol and a polyethylene oxide having a molecular weight of at least about 50,000 m.w.u. These phase change materials may also include a hydrophilic or hydrophobic silica from about 5 wt. % to about 35 wt. % of the phase change material.

Accordingly, it is an object of the present invention to provide a water heater which employs a phase change material to heat water. These, and other objects and advantages of the present invention, will become apparent from the following drawing, detailed description and claims.

DETAILED DESCRIPTION OF THE INVENTION

Figure 1:
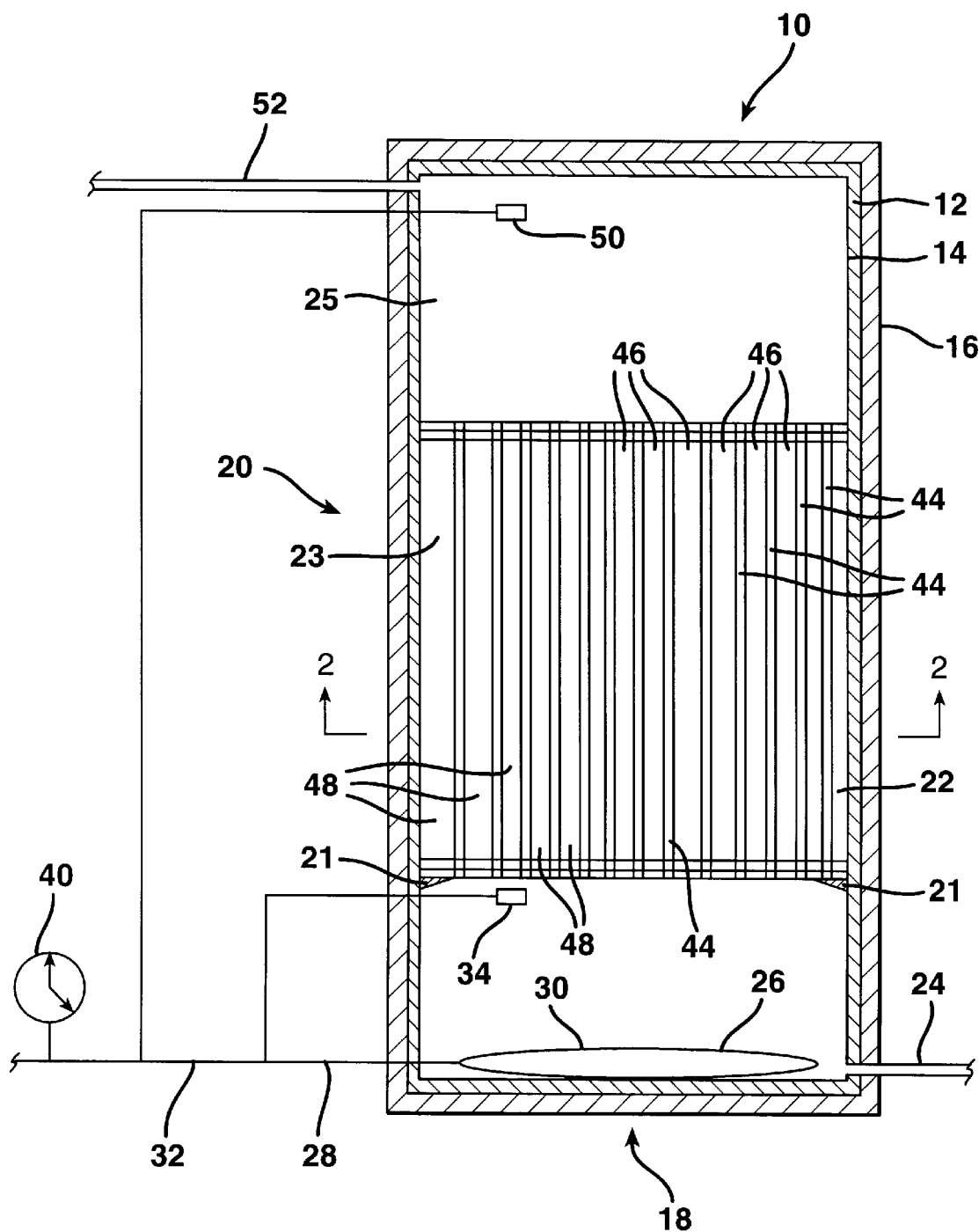
FIG. 1 presents a partial cross sectional view of one embodiment of the water heater of this invention.

FIG. 1 presents a partial cross sectional view of the water heater 10 of this invention. The water heater 10 comprises a shell 12 having an exterior surface 14 and insulation material 16. The shell 12 can be any shape and is desirably cylindrical. The insulation material 16 is attached to the outside surface 14 of the shell 12 and desirably covers the entire exposed outside surface 14 of the shell 12. Desirably, the insulation material 16 will have an "R" value of at least about 10. More desirably, the insulation material 16 is vacuum panel insulation having an "R" value of 25 per inch of thickness. The shell 12 includes a heating apparatus 18 and a heat exchanger 20. Water is supplied to the water heater 10 by means of a water inlet line 24.

Heating apparatus 18 includes a first heating element 26 which is connected to a power supply (not shown) by a first power supply medium 28. In the embodiment shown in FIG. 1, the heating apparatus 18 is located beneath the heat exchanger 20. To control the water temperature of the water heated by the first heating element 26, heating apparatus 18 may also include a first thermostat 34 which is connected to the first power supply medium 28.

First heating element 26 may be either an electric resistance heating coil 30, as shown in FIG. 1, a gas burning heating element or an oil burning heating element. If first heating element 26 is an electric resistance heating coil 30, then first power supply medium 28 will be an electric power line 32, as shown in FIG. 1. The electric heating coil 30 can be either an alternating current or a direct current heating coil. If the electric heating coil 30 is a direct current heating coil, then power could be supplied to it, for example, by either a photovoltaic cell, a wind turbine or another alternative energy source.

If first heating element 26 is a gas burning heating element or an oil burning heating element, then first power supply medium 28 will be a gas line or an oil line. Further, one skilled in the art will appreciate that if a gas burning heating element or an oil burning heating element is used with the water heater 10, then water heater 10 will include an a second heat exchanger to transfer heat from the flame of the heating element to heat exchanger 20. Such a modification is within the skill of one skilled in the art.

Figure 4:
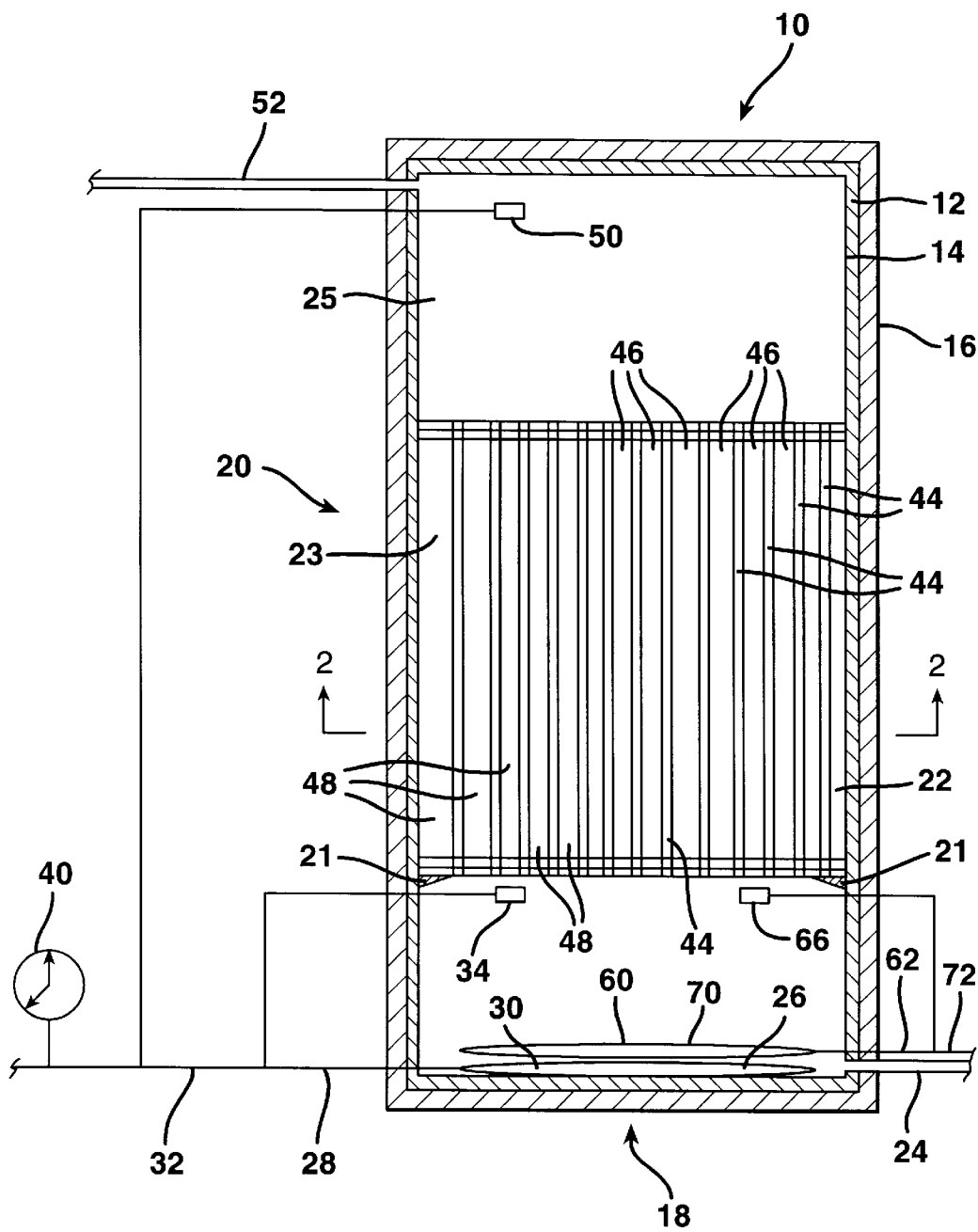
FIG. 4 presents a partial cross sectional view of a second embodiment of the water heater of this invention.

Heat exchanger 20 contains a heat exchange unit 22 which comprises a first compartment 23 and a second compartment 25. Heat exchange unit 22 is self contained and mounted on a ledge 21 inside of shell 12. First compartment 23 includes a plurality of heat exchange tubes 44 and heat exchange material 46. The heat exchange tubes 44 are located in the first compartment 23 of the heat exchanger 20. Desirably, heat exchange tubes 44 will be positioned substantially vertically in first compartment 23. The heat exchange tubes 44 can have any cross sectional shape and are desirably formed from any heat conducting material. Most desirably, the tubes 44 are formed from either copper or aluminum. The heat exchange tubes 44 can be maintained in position by being banded together by at least one band 58 and/or being supported by a pair of screens 59, as shown in FIG. 5, or a sealed top cover 56 and bottom cover (not shown), each having a plurality of openings 72, as shown in FIG. 4.

The heat exchange material 46 is positioned in the heat exchanger 20 such that the heat exchange material 46 is in heat transfer relation to the heat exchange tubes 44. The heat exchange material 46 is desirably a phase change material 48. The heat exchange material 46 is contained in the heat exchanger 20 such that it will not come into contact with water when the tank 10 is filled. The containment of heat exchange material 46 in heat exchanger 20 is described below.

Second compartment 25 can either be an integral portion of the heat exchanger 20 or a separate compartment in water heater 10. As shown in FIG. 1, second compartment 25 is separated from heat exchanger 20. The second compartment 25 can include a second thermostat 50 which is connected to the first electric lines 28 and which is provided to prevent overheating of the water by the first heating element 26. A water outlet line 52 is connected to the second compartment 25 to allow heated water to flow from the water heater 10.

The water heater 10 may also include an associated timer 40 connected with the first power supply medium 28. The timer 40 is provided to control the power usage of the heater 10 during designated time periods, e.g. turning off the first power supply medium 28 during peak usage hours.

Figure 2:
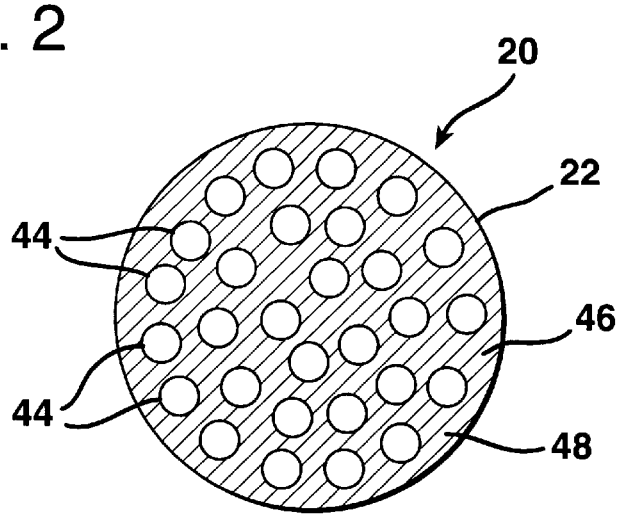
FIG. 2 presents a cross sectional view along line 2—2 of FIG. 1 of one embodiment of the heat exchange unit.

FIG. 2 presents a cross sectional view of heat exchanger 20 along line 2—2 in FIG. 1. As can be seen in FIG. 2, the heat exchange material 46 is located between and around the heat exchange tubes 44 to substantially fill any spaces between the heat exchange tubes 44. The heat exchange material 46 is located in heat transfer contact with the heat exchange tubes 44 so that as water flows through heat exchange tubes 44, heat can be transferred from the phase change material 48 to the water and vice versa. In this embodiment, the heat exchange tubes 44 are spaced so that a maximum amount of the heat exchange material 46 can be placed in heat exchange unit 22 of heat exchanger 20.

Figure 3:
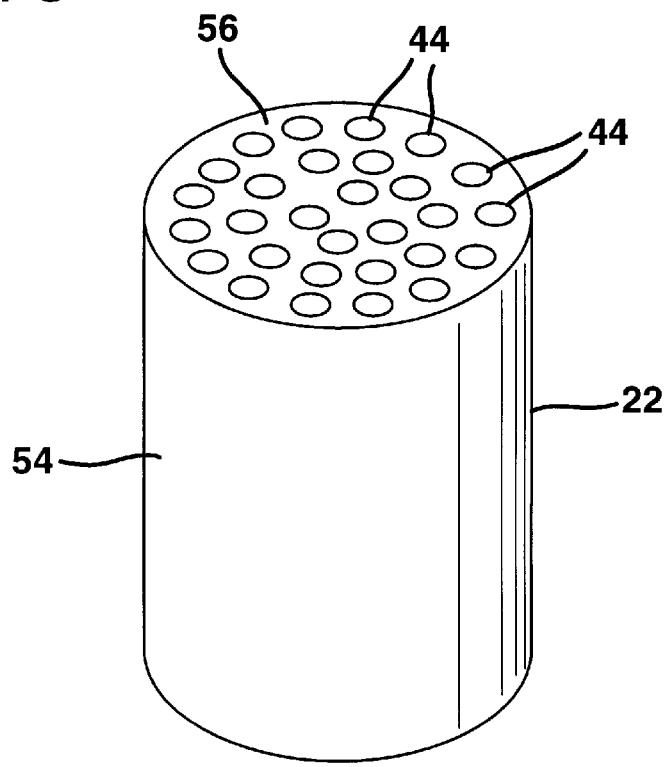
FIG. 3 presents a perspective view of the embodiment of the heat exchange unit shown in FIG. 2.

FIG. 3 presents a perspective view of the heat exchange unit 22 shown in cross section in FIG. 2. The heat exchange tubes 44 are contained in a sealed container 54 which is covered by top cover 56 and the bottom cover (not shown). Openings 72 correspond in position with the open ends of tubes 44 to allow water to flow through container 54. By providing sealed cover 56 and the bottom cover to contain the heat exchange tubes 44, the heat exchange material 46 is prevented from becoming wetted by the water while the water heater 10 is in use. Further, by providing the heat exchange tubes 44 and the heat exchange material 46 in container 54, heat exchange unit 22 can be placed into and removed from shell 12 of water heater 10 as a single unit.

The water heater 10 of the present invention functions in the following manner. Water is supplied to the heater 10 through water inlet line 24 into shell 12. The water in shell 12 is then heated by first heating element 26. The temperature of heating element 26 can be monitored by first thermostat 34 to prevent over heating of the water and/or the phase change material 48. The heated water is then passed through the heat exchanger 20. In the heat exchanger 20 shown in FIGS. 2 and 3, the water flows through the first compartment 23 of heat exchanger 20 through means of heat exchange tubes 44. In the heat exchanger 20, heat from the heated water is transferred to the heat exchange material 46 from the water to heat the heat exchange material 46 by means of the heat exchange material 46 being in heat transfer contact with the heat exchange tubes 44. The water passes through heat exchange unit 22 by means of a thermosiphon process, i.e., the heated water rises to the top of the shell 12 through heat exchange unit 22 by means of its specific gravity being lower than that of the lower temperature water in the water heater 10. The heated water is then stored in the second compartment 25 of heat exchanger 20.

When the heating apparatus 18 is not in operation, e.g., during peak times of power usage, the heat exchanger 20 heats the water. Once the temperature of the water approaches the freezing/melting point of the heat exchange material 46, heat is transferred from the heat exchange material 46 to the water. As the heat is transferred to the water, the temperature of the water is raised. Because the latent heat of the heat exchange material 46 is greater than the sensible heat of water, heat exchange material 46 provides a more efficient storage material for storing heat in heater 10 than water does in conventional water heaters. Further, the heated water is supplied by water heater 10 at nearly constant temperature equivalent to the freezing point of the phase change material 48. This "plateau" of constant temperature remains until the latent heat capacity of the phase material 48 has been used up. This further differs from conventional water heaters in which heated water is delivered on a thermocline of descending temperature.

FIG. 4 presents a partial cross sectional view of another embodiment of this invention. In this embodiment, the heating apparatus 18 includes a first heating element 26, as described above, and a second heating element 60 which is connected to a second power supply (not shown) by a second power supply medium 62. Second element 60 may be an electric resistance heating element, a gas powered heating element, or an oil powered heating element. Heating apparatus 18 may also include a third thermostat 66 which is connected to the second power supply medium 62. The remaining elements of the water heater 10 are the same as described above and function as they are described above.

In this embodiment, the second heating element 60 is an electric resistance coil 68. The second heating element 60 is provided so that the water heater 10 would have a second source of heat during times at which the first heating element 26 is not in operation. The second heating element 60 will desirably be a direct current resistance heating element 70. With a direct current resistance heating element, power can be supplied to second heating element 60 by a direct current power supply 72, such as a photovoltaic cell or a wind turbine. Thus, water and the heat exchange material 46 could be heated by the second heating element 60 during peak hours of consumption of conventional energy, such as alternating current electricity and gas, and heated by the first heating element 26, which is powered by conventional power sources, during off-peak hours. This would reduce peak hour consumption of conventional power sources, such as alternating current electricity, oil and gas, and provide a further savings in money spent on power for the water heater 10. In geographic areas of high solar insolation or persistent winds, these power sources may support the total heating of water heater 10.

The present invention makes use of phase change materials 48 to serve as the heat exchange material 46. The phase change compositions 48 will have melting/freezing temperatures from about 15° C. to about 100° C. to efficiently maintain the temperature of the water at a temperature which provides a sensation of warmth when touched. The phase change compositions 48 useful with this invention will have a latent heat greater than the sensible heat of liquid water. Desirably, they will have a heat capacity of at least about 25 cal/g.

The phase change materials 48 store heat energy from the water and provide heat to the water when necessary. Phase change materials 48 may be repeatedly converted between solid and liquid phases to utilize their latent heats of fusion to absorb, store and release heat during such phase conversions. These latent heats of fusion are greater than the sensible heat capacities of water. For example, in phase change materials 48, the amount of energy absorbed upon melting or released upon freezing is much greater than the amount of energy absorbed or released upon increasing or decreasing the temperature of water over an increment of 10° C. In fact, phase change materials 48 can store approximately three to five times more energy than water. Thus, by using phase change materials 48 to store heat instead of storing heat in the water, the water heater 10 can provide three to five times more heated water than a conventional water heater. Alternatively, the water heater 10 could be ⅓–⅕ the size of a conventional water heater and still provide the same amount of heated water.

Upon melting and freezing, the phase change material 48 absorbs and releases substantially more energy per unit weight than a sensible heat storage material that is heated or cooled over the same temperature range. In contrast to a sensible heat storage material which absorbs and releases energy essentially on a thermocline over a broad temperature range, the phase change material 48 absorbs and releases a large quantity of energy in the vicinity of its melting/freezing point. Additionally, the heated water is delivered at a nearly constant temperature which can be selected to be in the temperature range that is comfortable for bathing and other household activities.

By using phase change materials to store and release heat energy from and to water, the temperature of the water produced by the water heater 10 can be controlled through selection of the phase change material 48 based upon its freezing/melting temperature. For example, in home use, a useful water temperature typically does not exceed about 60° C., thus a phase change material having a melting temperature of approximately 54° C. would be ideal. In situations where higher water temperatures are desired, then phase change materials with higher freezing/melting temperatures could be used.

One phase change material 48 which can be used to form the heat exchange material 46 is a composite phase change material such as that disclosed in U.S. Pat. No. 5,565,132 entitled "Thermoplastic, Moldable, Non-extruding Phase Change Materials" of which I am the inventor and which is hereby incorporated by reference in its entirety. In its most basic form, this phase change material is a solidified melt mixture of a polyolefin resin, an ethylene copolymer, silica particles, and an alkyl hydrocarbon phase change material.

The polyolefin resin is desirably a high-density polyethylene (HDPE) or polypropylene having a molecular weight or melt index in the range of 0.5 to 5 decigrams/minute. Examples of useful high density polyethylenes are Marlex 6006 and Alathon 6210 from Phillips Chemical Co., Bartlesville, Okla. and Occidental Chemical Company, Niagara Falls, N.Y., respectively. The HDPE, when it cools from the melt, establishes a matrix within which the lower melting phase change material can melt and freeze without changing the volume of the composite significantly. Thus, the melting temperature of the polyolefin must be well above the highest temperature that will be encountered in use. For this reason, commercial low-density polyethylenes would be less desirable though not without some utility. It also is possible to substitute a higher melting polypropylene for HDPE, which may be a decided advantage in some applications, although, processing is more difficult.

The ethylene copolymer serves a compatibilizing bridge between the low molecular weight phase change material and the high molecular weight, high melting HDPE or polypropylene. The ethylene copolymer is desirably an ethylene-vinyl acetate copolymer containing approximately 10–20% by weight vinyl acetate, but may also be an ethylene-methyl acrylate copolymer, an ethylene-ethyl acrylate copolymer, or equivalent molar copolymer. A series of ethylene-vinyl acetate (EVA) copolymers containing from 5 to 28% wt. of vinyl acetate were tested for compatibility and phase change material oozing reduction. As a result, copolymers in the range of 10–20% wt. of vinyl acetate are desired and those containing about 15–17% wt. vinyl acetate most desired. Generally, comparable compatibility and nonoozing could be obtained in melt-mixed blends wherein equivalent quantities of ethylene/methyl acrylate (EMA), or ethylene/ethyl acrylate (EEMA) are substituted for EVA.

The silica in the composite phase change material is added to tie up the low-melting phase change material in a stable gel to further prevent oozing. The amount of silica is, therefore, directly related to the amount of the phase change material and should be about 10–30 wt. % of the phase change material. The silica particles are desirably precipitated silica particles having a surface area of from 50 to 500 square meters per gram and primary particle sizes of from 0.005 to 0.025 microns. One useful silica is ABS precipitated silica from PPG Industries Inc., of Pittsburgh, Pa., which is a normal, hydrophilic silica with a surface area of 150 $m^2$/gram and a particle size of about 0.022 microns. However, other precipitated silica having a comparable particle size and surface area would work equally as well. Fumed silicas of comparable or smaller particle size and equal or greater surface area should also be satisfactory, but are much more expensive.

Another useful silica is a precipitated or fumed silica which has been surface treated with silane coupling agents or silicone resins to provide a hydrophobic surface which renders the silica unaffected by water or relatively high humidity. Hydrophobic silica is desired because it also more receptive to the alkyl hydrocarbon phase change material.

Substantially any phase change material can be used which is compatible with the polyolefin. In many cases, compatible phase change materials will be characterized by long, linear alkyl hydrocarbon chains comprising their molecular structure. Desirable phase change materials are crystalline organic compounds such as linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons which melt and freeze within the desired thermal transfer temperature range of about 15° C. to about 100° C. A particularly useful non-fossil fuel phase change material is n-octadecanoic acid or, as it is known by its common name, stearic acid. Stearic acid is colorless, wax-like solid which has a melting/freezing point of about 69.6° C. Stearic anhydride may also be used as a phase change material in the present invention. Stearic anhydride has a melting point of about 71° C.

A number of commercially available waxes are useful as phase change materials in the present invention including Shellwax 100 (MP 42–44° C.), Shellwax 120 (MP 44–47° C.), Shellwax 200 (MP 52–55° C.), Shellwax 300 (MP 60–65° C.) all of which are products of Shell Oil Co., Houston, Tex.; Boron R-152 (MP 65° C.) a product of BP America, Cleveland, Ohio; Union SR-143 (MP about 61° C.) a product of Union Oil Co., Los Angeles, Calif.; Witco 128 (MP about 53° C.), Witco LLN, Witco 45A, Witco K-18, Witco K-19, Witco K-61, Witco K-51, and Witco 85010-1 all products of Witco Corp., New York, N.Y.; Aristowax 143 (MP 34–61° C.) from Unocal Corp., Los Angeles, Calif., and Paraffin 150 (MP about 61° C.). These waxes have heats of fusion greater than 30 cal/g and by comparison to other phase change materials, they are inexpensive, non-corrosive and non-toxic. Many of them cost as little as $0.15 (U.S.) per pound when purchased in a tank car quantity.

For the melt mix composition, the thermal storage depends upon the hydrocarbon component. If a "pure" hydrocarbon is used the thermal storage ability is 60 cal/g, but if an impure hydrocarbon is used, the thermal storage drops to 40–45 calories per gram. The term "pure" is used herein to mean that the carbon chain length is comprised of molecules of essentially single carbon chain length and without any branches. Thus, a 100% pure hydrocarbon would be a straight chain hydrocarbon, such as $C_{20}$, having no branches. If the concentration of the hydrocarbon is 60% of the melt mix composition, then the energy storage will be equivalent to 60% of the thermal storage ability of the hydrocarbon component.

The phase change materials useful with the composite phase change material may also be used as the heat exchange material 46 by themselves. Useful phase change materials will desirably be characterized by a long, linear alkyl hydrocarbon chains comprising their molecular structure. Desirable phase change materials are selected from the group consisting of linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons. These materials melt and freeze within the desired thermal transfer temperature range of about 15° C. to about 100° C. A particularly useful non-fossil fuel phase change material is n-octadecanoic acid or, as it is known by its common name, stearic acid. Stearic acid is colorless, wax-like solid which has a melting/freezing point of about 69.6° C. Stearic anhydride may also be used as a phase change material in the present invention. Stearic anhydride has a melting point of about 71° C.

Optionally, silica can advantageously be used to increase the viscosity of the above listed phase change materials 48 to impart a gel-like structure to the phase change material 48. The silica will typically be present in an amount from about 5 weight percent to about 35 weight percent of the weight of the phase change material 48. Desirably, the silica will be present in an amount of about 20 weight percent to about 25 weight percent of the phase change material. Useful silicas are the same as those disclosed above.

Another phase change material 48 useful to form the heat exchange material 46 is a polyethylene oxide. Useful polyethylene oxides are chosen for an optimal combination of strength and melt processability. Because polyethylene oxides have melting and freezing temperatures of approximately 60° C. to 65° C., they are particularly useful in this application.

The strength of polyethylene oxides increase with increasing molecular weight while the melt processability decreases with increasing molecular weight. The strength of such a polymer increases rapidly up to a weight of 100,000 m.w.u. but then plateaus as the molecular weight exceeds 1,000,000 m.w.u. In regard to melt processability, molecular weights less than 100,000 m.w.u. are extremely easy to process. Thus, a useful polyethylene oxide has a molecular weight above about 50,000 m.w.u. Desirably, the polyethylene oxide will have a molecular weight of about 75,000 m.w.u. to about 500,000 m.w.u. Useful polyethylene oxides store about 40 cal/g of thermal energy. Optionally, silica can advantageously be used to increase the viscosity of the polyethylene oxide and impart a gel-like structure to low viscosity polyethylene oxide polymers. The silica will typically be present in an amount from about 5 weight percent to about 35 weight percent of the weight of polyethylene oxide. Desirably, the silica will be present in an amount of about 20 weight percent to about 25 weight percent of the phase change material. Useful silicas are the same as those disclosed above.

Another phase change material 48 useful with this invention is polyethylene glycol. Polyethylene glycols (PEG) are a series of lower molecular weight analogues to polyethylene oxides. The melting temperature of PEGs increases with increasing molecular weight. For example, the melting point of a polyethylene glycol polymer with a molecular weight of 300 m.w.u. is approximately −10° C. and PEGs with a molecular weight of greater than 8,000 m.w.u. have a melting point which levels out at about 60° C. Useful PEGs can be chosen dependent upon the desired temperature range in which the phase change material will be used. The thermal energy storage of PEGs also increases slightly with increasing molecular weight but levels out at approximately 40 calories per gram at molecular weights above 5,000 m.w.u. The thermal energy storage of PEGs useful with invention averages about 35 cal/g. Optionally, silica can be used to increase the viscosity of the PEG and impart a gel-like structure to low viscosity PEG polymers. The silica will typically be present in an amount from about 5 weight percent to about 35 weight percent of the weight of PEG. Useful silicas are the same as those disclosed above.

Because each polyethylene glycol molecule has two terminal hydroxyl groups, PEGs can be reacted with polyfunctional isocyanates to produce urethane polymers which retain the crystalline melting temperature and thermal storage characteristics of the PEG. PEGs crosslinked with polyfunctional isocyanates do not exhibit a melt flow above the crystalline melting point of the PEG component. If the PEG is reacted with a polyfunctional isocyanate, the PEG will desirably constitute about 60% to about 70% of the resultant polymer.

Still another useful phase change material 48 can be formed by integrally incorporating PEG polymers into polyethylene terephthalate polymers by substituting PEG for all or part of the ethylene glycol component of the polyethylene terephthalate polymer. Again, the properties of the useful PEG are determined by the desired temperature for the heat storage material. The highest thermal storage is obtained by replacing all of the ethylene glycol with PEG. However, to obtain better strength properties, it may be desirable to incorporate a minor percentage (about 10–30%) of ethylene glycol into the molecular structure. In a preferred embodiment, the PEG polymer will constitute about 60% to about 70% of the resultant thermal energy storage material.

PEGs and polyethylene oxides can be blended together to provide a polymer blend in which the polyethylene oxide is selected to provide a matrix for the PEG. The ratio of PEG to polyethylene oxide in the mixed polymer ranges from about 80–20 to about 60–40. The thermal storage capacity of the polymer blend depends upon the ratio of the components in the blend. In the blend, silica can advantageously be used to increase the viscosity of the blend and impart a gel-like structure to those blends having low viscosity. The silica will typically be present in an amount from about 5 weight percent to about 35 weight percent of the weight of the blend. Useful silicas are the same as those disclosed above.

While certain representative embodiments and details have been shown for purposes of illustrating the invention, it will be apparent to those skilled in the art that various changes in the compositions and apparatus disclosed herein may be made without departing from the scope of the invention, which is defined in the appended claims.

What is claimed is:

1. A water heater for heating water comprising:
   a material having a thermal energy capacity of at least about 25 cal/g and having a freezing/melting from about 15° C. to about 100° C. wherein said material is melt mix polymer comprising a phase change material, a polyolefin, an ethylene copolymer and silica particles;
   a source of water;
   a heating element for heating the water from said source;
   a heat exchange unit which contains said material; and
   a plurality of heat exchange tubes positioned in said heat exchange unit with said material located between and around said heat exchange tubes to substantially fill any spaces between said heat exchange tubes, said tubes being in heat transfer relation to said material and in fluid connection with said source of water so that the water heated by said heating element flows through said tubes and heats said material and thereafter the heat stored in said material can be transferred through said tubes to water flowing therethrough at nearly constant temperature equivalent to the freezing/melting temperature of said material.

2. The water heater of claim 1 wherein the heat exchange tubes are positioned substantially vertically in said water heater above said heating element to permit upward flow of heated water by a thermo-siphon process.

3. The water heater of claim 1 further including a shell having an exterior surface, the heating element and the heat exchange unit being enclosed in the shell, and a layer of insulation on the exterior surface of the shell.

4. The water heater of claim 3 wherein said insulation has an "R" value of at least about 10.

5. The water heater of claim 4 wherein said insulation is vacuum panel insulation having an "R" value of at least about 25 per inch of thickness.

6. The water heater of claim 1 wherein said melt mix polymer comprises, by weight of total composition, about 60% phase change material, from about 16% to about 22% polyolefin, from about 8% to about 12% ethylene copolymer, and from about 8% to about 16% silica particles.

* * * * *

UNITED STATES PATENT AND TRADEMARK OFFICE
CERTIFICATE OF CORRECTION

PATENT NO.    : 6,047,106                                          Page 1 of 1
DATED         : April 4, 2000
INVENTOR(S)   : Ival O. Salyer It is certified that error appears in the above-identified patent and that said Letters Patent is hereby corrected as shown below:

<u>Claim 1, column 10,</u>
Line 13, "freezing/melting from" should read - - freezing/melting temperature from - -.

Signed and Sealed this

Third Day of July, 2001

*Attest:*

*Attesting Officer*

NICHOLAS P. GODICI
*Acting Director of the United States Patent and Trademark Office*